C. A. STOCKSTROM.
Assignor of one-half to L. STOCKSTROM.
GASOLINE STOVE ATTACHMENT.
No. 11,037. Reissued Oct. 22, 1889.
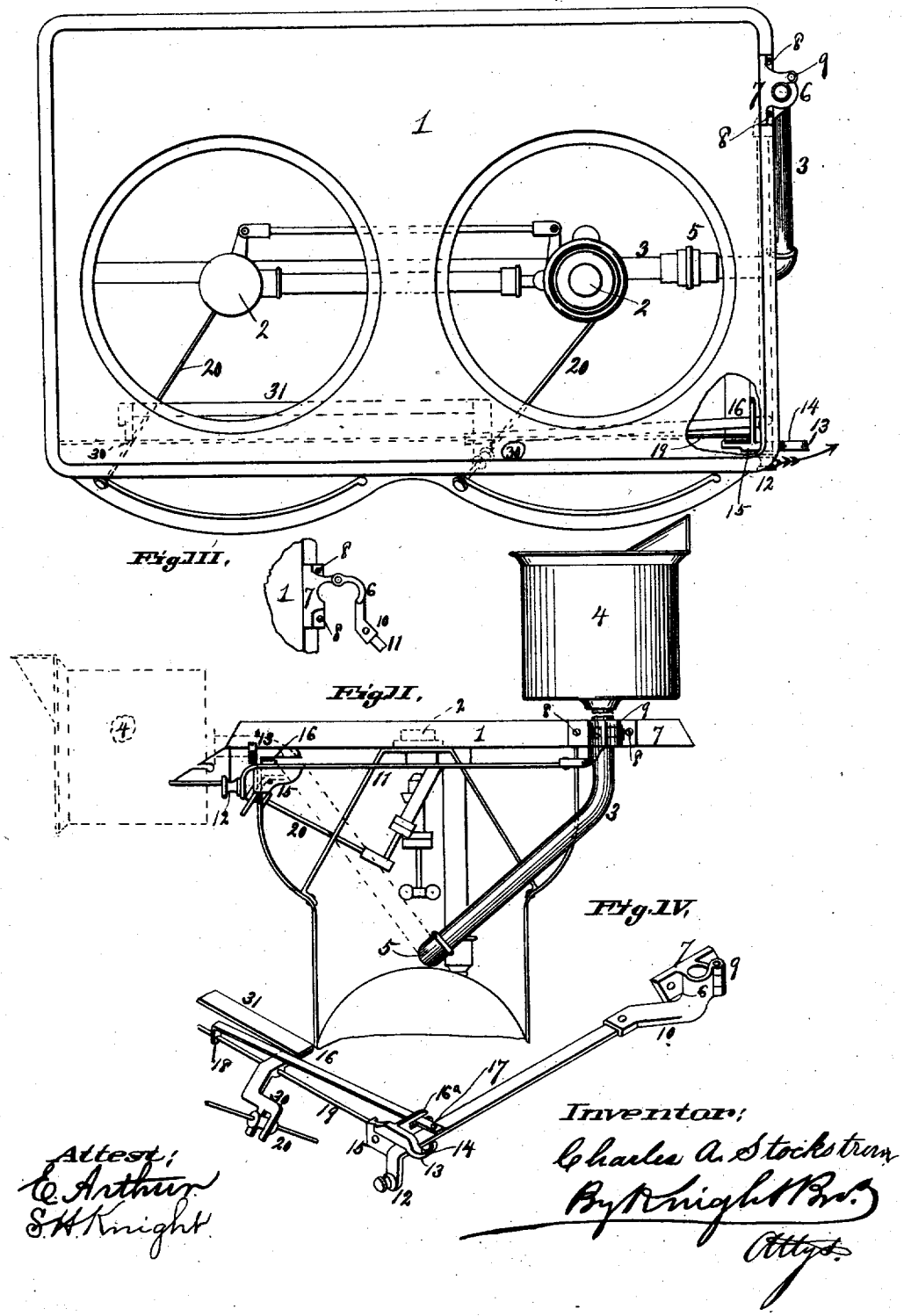
N. PETERS, Photo-Lithographer, Washington, D. C.

UNITED STATES PATENT OFFICE.

CHARLES A. STOCKSTROM, OF ST. LOUIS, MISSOURI, ASSIGNOR OF ONE-HALF TO LOUIS STOCKSTROM, OF SAME PLACE.

GASOLINE-STOVE ATTACHMENT.

SPECIFICATION forming part of Reissued Letters Patent No. 11,037, dated October 22, 1889.

Original No. 390,624, dated October 2, 1888. Application for reissue filed August 10, 1889. Serial No. 320,423.

*To all whom it may concern:*

Be it known that I, CHARLES A. STOCKSTROM, of the city of St. Louis, in the State of Missouri, have invented a certain new and useful Improvement in Vapor-Stove Attachments, of which the following is a full, clear, and exact description, reference being had to the accompanying drawings, forming part of this specification, and in which—

Figure I is a top view of a vapor-stove provided with my improvement, the oil-tank being omitted. Fig. II is an end elevation with part of the supply-pipe broken away, the lower position of the oil-tank being shown in dotted lines. Fig. III is a detail view of my clamp for holding the tank in normal position, the clamp being open. Fig. IV is a perspective view of the clamp, its operating-lever, the arm upon which the supply-pipe rests while the tank is in filling position, and the bar (with its guide-rod) which is connected to the lever, and which insures the closing of the burner-valve before the tank can be lowered.

My present invention relates to that class of vapor-burners or gasoline-stoves having a tank which is lowered for the purpose of filling it and raised to its normal position for use.

My invention consists in features of novelty hereinafter fully described, and pointed out in the claims.

Referring to the drawings, 1 represents the table or frame of a gasoline-stove; 2, the generator and side burners; 3, the pivoted supply-pipe, and 4 the oil tank or reservoir. The supply-pipe is provided with a joint 5, by means of which the tank may be lowered into the position shown by dotted lines in Fig. II for the purpose of filling it. The tank is held in its normal position by means of a clamp 6 7. The fixed part 7 of the clamp is secured, by suitable rivets or screws 8, to the table or frame of the stove, and the moving part 6 is hinged or pivoted to the fixed part 7 at 9, so that it may be swung out into the position shown in Fig. III, for the purpose of releasing the supply-pipe and permitting it to be turned down, as shown by dotted lines in Fig. II. The moving part 6 is preferably provided with an arm 10, to which is connected a lever 11, which may be provided with a handle or knob 12. It will thus be seen that by taking hold of the handle or knob 12 and moving the lever outwardly to the position shown in Fig. III the supply-pipe will be released from its clamp and allowed to be turned down, as stated, and then by moving the lever into the position shown in Fig. IV, after first, of course, having raised the oil-tank and supply-pipe to their normal positions, the parts will be held firmly in such position.

When lowered, the supply-pipe rests in an arm 13, preferably formed with a concavity 14, in which the pipe rests. The arm 13 is formed upon a bracket or casting 15, secured to the table or frame of the stove and supporting the rod 19, and bolted or riveted to the table or frame.

It is desirable, for safety, not to have the burners lighted when the oil-tank is lowered to be filled or while the oil-tank is being filled. For this purpose I provide a device in which, if the burner valve or valves are open when the lever 11 is moved out to open the clamp of the supply-pipe, such valve or valves will be closed by the act of operating the lever. Part of the means I have shown to accomplish this is similar to that shown in my patent dated September 28, 1886, No. 350,094, for operating two of the valves simultaneously. The other part of said means consists of a bar 16, guided in and supported on the arm 16[a], formed on the bracket 15, connected at 17 to the lever 11 and provided with a perforated angled end 18, supported and working on the guide-rod 19. The end 18 is located at one side of an arm 30, (through which the rod 19 loosely passes,) secured to a sliding bar 31, (see Fig. IV,) shown in my patent referred to. The lower end of the arm 30 is slotted to receive the valve-lever 20. The bar 31 may extend, as shown in dotted lines, Fig. I, and have a plain unslotted arm or arms 30 for another burner or burners, and it will thus be seen that if either of the valves is open when the lever 11 is moved outwardly the end 18 of the bar 16 will come against the slotted arm 30, and, shifting the bar 31, close the valve or valves. It will be seen that when the lever 11 is in its closed or normal position the valves may be opened or closed without regard to or affecting the lever 11 and bar 16, or without being interfered with thereby, and, in case they are open, when the lever 11 is operated to allow the tank to be turned down they will be closed, thus rendering it impossible to fill the tank while the burners are lighted, it being understood that the tank cannot be filled until it is turned down, as is usual with this class of reservoirs.

I am aware of the patent issued to Zebulon Davis, January 27, 1885, No. 311,459, and I am also aware of the patent issued to John Ringen, June 3, 1884, No. 299,853, and do not claim anything shown or described therein.

Having thus described my invention, the following is what I claim as new therein and desire to secure by Letters Patent:

1. In a vapor-stove, a lay-down tank, in combination with stationary burner having a valve and valve-stem and a locking device mechanically connected with said stem and adjustable in the path of the tank-pipe to lock the tank in raised position, substantially as set forth.

2. In a vapor-stove, a supply-pipe for the burner and a lay-down tank and pipe pivoted on the supply-pipe, in combination with a burner, a valve and valve-stem therefor, and a locking device connected with the said valve-stem and constructed to be adjusted in the path of the tank-pipe, whereby when the burner-valve is open the tank will be locked in raised position, substantially as set forth.

3. In a gasoline-stove, the combination of the valve, the valve-lever, oil-tank, swinging supply-pipe to which the tank is connected, the clamp having hinged part for holding the supply-pipe in an upright or using position, and connection between said hinged part of the clamp and the valve-lever, whereby the valve is turned and closed when the clamp is opened to lower the tank, substantially as and for the purpose set forth.

4. In a gasoline-stove, the combination of the valve, the valve-lever, oil-tank, swinging supply-pipe to which the tank is connected, the clamp for holding the supply-pipe in its upright or normal position, having lever 11, and mechanism connecting said levers, whereby the valve is turned and closed and the clamp opened by the outward movement of the clamp-lever to release the supply-pipe, substantially as and for the purpose set forth.

5. In a gasoline-stove, the combination of a valve, valve-lever, oil-tank, swinging supply-pipe to which the oil-tank is connected, the clamp for holding the supply-pipe in an upright position, lever 11, secured to said clamp, and means for operating the valve-lever connected to the clamp-lever, consisting of a bar 16, provided with the angled end 18, and the sliding bar 31, having arm 30, substantially as and for the purpose set forth.

6. In a gasoline-stove, the combination of the valve, valve-lever, swinging supply-pipe, oil-tank connected to the pipe, the clamp having fixed part 7 and moving part 6 for holding the pipe in its upright position, lever 11, secured to the moving part of the clamp, and means forming a connection between the clamp-lever and the valve-lever, substantially as and for the purpose set forth.

7. In a gasoline-stove attachment, in combination with the valve, valve-lever, swinging supply-pipe, tank secured to the pipe, means for holding the pipe in an upright position, consisting of a clamp comprising a fixed part 7, secured to the frame of the stove, and a moving part 6, pivoted to the fixed part, a lever connected to the moving part of the clamp, and a bar 16, connected to the clamp-lever, having an angled end 18, and a bar 31, having an arm 30, substantially as and for the purpose set forth.

8. The combination, with a gasoline-stove having a pivoted supply-pipe provided with a tank, of the clamp secured to the stove, having a fixed part 7 and a hinged part 6, provided with an arm 10, and lever 11, substantially as described.

9. The combination, with a gasoline-stove having a pivoted supply-pipe provided with a tank, of the bracket 15, secured to the stove, formed with an arm 13, for supporting the supply-pipe when in lowered position, and a clamp having fixed part 7, moving part 6, for holding the pipe in normal position, and a lever 11, substantially as described.

10. The combination, with a gasoline-stove having a pivoted supply-pipe provided with a tank, a valve having a lever by which it is turned, a sliding bar 31, having an arm 30 engaging the valve-lever, and a rod 19, on which the bar slides, of the clamp having a lever, and a bar 16, connected with the clamp-lever, having an angled end 18, adapted to slide on the bar for engaging the arm of the bar when the clamp-lever is moved outwardly, substantially as described.

CHAS. A. STOCKSTROM.

In presence of—
EDW. S. KNIGHT,
THOMAS KNIGHT.